No. 894,018. PATENTED JULY 21, 1908.
W. F. KRICHBAUM.
AUTOMATIC PRESSURE CONTROLLING DEVICE.
APPLICATION FILED APR. 13, 1906.
2 SHEETS—SHEET 1.
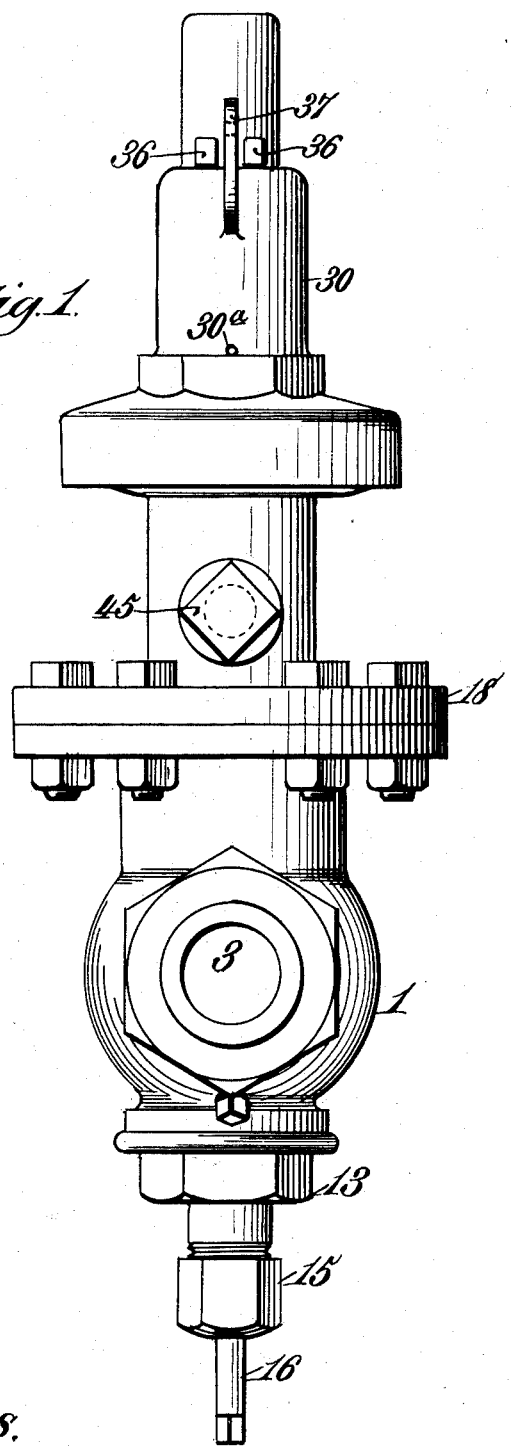
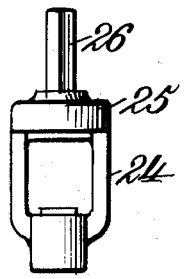

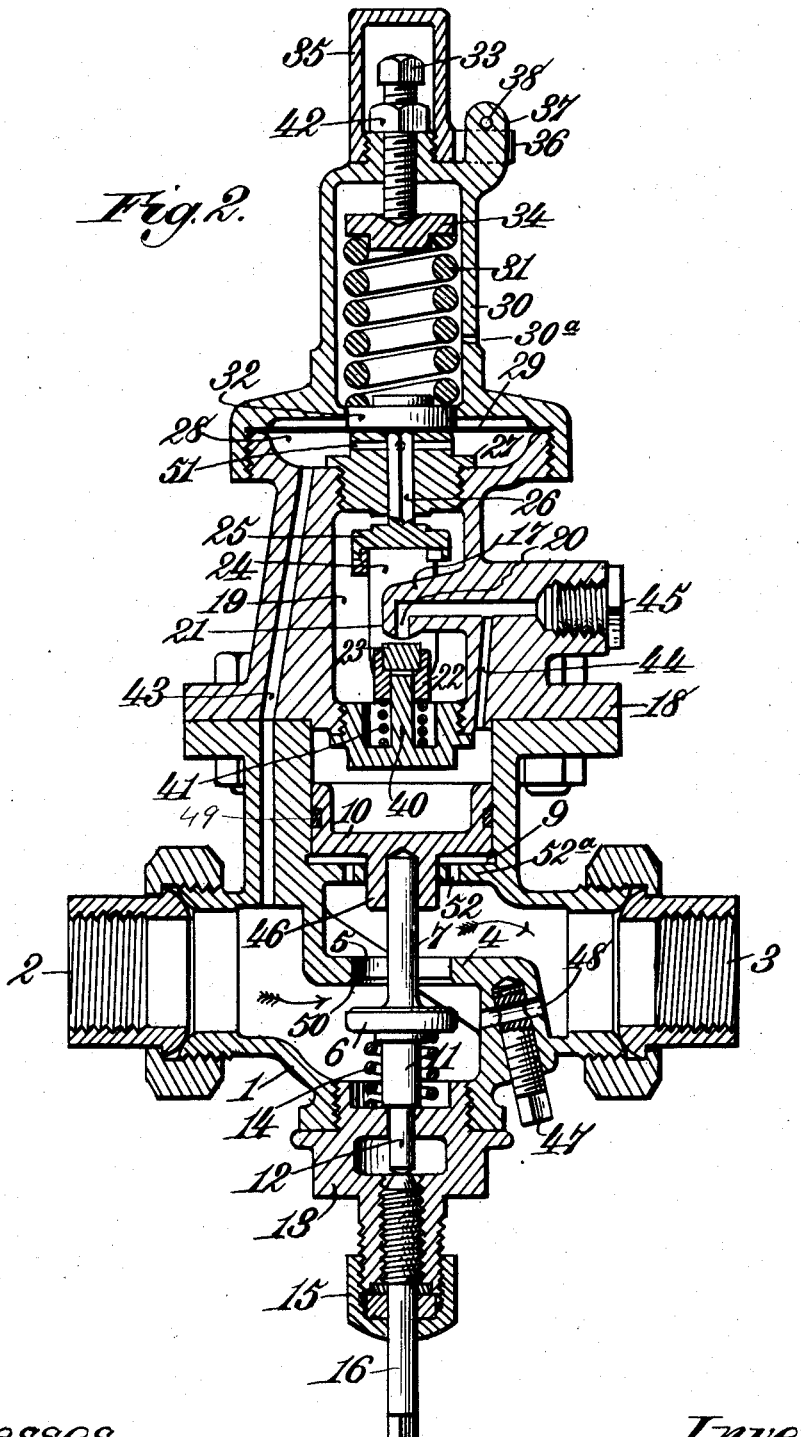

UNITED STATES PATENT OFFICE.

WILLIAM F. KRICHBAUM, OF NEWARK, NEW JERSEY, ASSIGNOR TO FOSTER ENGINEERING CO., OF NEWARK, NEW JERSEY, A CORPORATION OF NEW JERSEY.

AUTOMATIC PRESSURE-CONTROLLING DEVICE.

No. 894,018.  Specification of Letters Patent.  Patented July 21, 1908.

Application filed April 13, 1906. Serial No. 311,536.

*To all whom it may concern:*

Be it known that I, WILLIAM F. KRICHBAUM, a citizen of the United States, residing at Newark, in the county of Essex and State of New Jersey, have invented new and useful Improvements in Automatic Pressure-Controlling Devices, of which the following is a specification.

This invention relates to that class of automatic pressure controlling devices which are operated by the initial pressure acting upon a piston and actuating a main valve to open the same, the admission of said initial pressure to the piston being controlled by an auxiliary valve which is in turn operated by a diaphragm subject to any variations of the said initial pressure acting on one side of said diaphragm and opposed by a spring or its equivalent.

The main objects of the invention are to provide such a pressure controlling device that it will maintain a uniform boiler pressure by transmitting variations therein to a jet or blower engine, and also to provide a pressure controlling device having a simplified construction, and wherein friction is reduced to a minimum; to secure in the controlling device an auxiliary valve operating to close with the flow of the initial pressure, this valve having a guide stem with passages leading from the diaphragm chamber to an auxiliary chamber; also to provide a by-pass adapted to be used for controlling the minimum flow of fluid and a bottom limit to control the maximum flow; and to secure other advantages and results, which will be more fully hereinafter set forth.

In the drawings, Figure 1 is an elevation of a pressure controlling device or regulator embodying the features of the invention. Fig. 2 is a central vertical section thereof. Fig. 3 is a detail elevation of a part of the controlling device or regulator.

Similar numerals of reference are employed to indicate corresponding parts in the views.

The numeral 1 designates the main portion or body of the controlling device or regulator, and is provided with an inlet 2 and an outlet 3. Interposed between the said inlet and outlet is a horizontally disposed partition 4, having a valve opening 5 affording communication between the inlet and outlet. A main valve 6 controls the opening 5, and is provided on its upper side with a stem 7, extending through and working in an opening in the bottom of a piston 10, the latter abutting stem 7, and said stem and piston having a free or loose fit in the cylinder 9, forming part of the body of the controlling device or regulator.

From the lower side of the valve 6, a stem 11 depends and extends down and works in a guide 12, in a bottom plug 13, which screws into the underside of the body and centers the said main valve 6. Between the valve 6 and the bottom plug 13 a spring 14 is interposed and is of sufficient strength to support the combined weight of the piston 10 and the valve 6. Screwed in the bottom plug 13, in line with the main valve 6, is a limit screw 16, surrounded by a stuffing box 15 which is adapted to be engaged by the valve 6 to limit the downward movement of the said valve and thus determine the maximum amount of fluid which may pass through the opening 5 when the initial pressure falls below that at which a main spring is set, and which will be more fully hereinafter set forth.

On the main body of the controlling device or regulator a top casing 18 is applied, and has a projecting neck 17 formed integral therewith, the casing having an auxiliary valve chamber 19 formed therein and into which the said neck projects. The neck 17 is drilled to form an angular continuation 44 of the supply port 20 leading from said auxiliary valve chamber 19 to the cylinder 9. The neck 17 has a downwardly projecting portion 21, which provides a knife edge seat for an auxiliary valve 22, thus preventing wire-drawing of said auxiliary valve seat.

The auxiliary valve 22 includes in its organization a disk 23, which seats against the knife edge at the terminal of the downwardly projecting portion 21 of the neck 17, the said disk being carried by a yoke 24 depending from a cap 25. This auxiliary valve is centered by a guide stem 26 rising from the cap 25, the latter being loosely fitted to the yoke 24. The guide stem 26 has four flat sides, and freely works in a guide sleeve 27, having ports 51 to communicate with the said flat sides of the guide stem, the latter providing passages, owing to its contour, and the circular contour of the opening in the sleeve 27, to set up communication between the ports 51 and the auxiliary valve chamber 19, and thus provide for the entrance of the initial pressure into the said auxiliary valve chamber.

Above the auxiliary valve chamber a pressure chamber 28 is located and has a diaphragm 29 therein held between the top casing 18 and an upper spring chamber casting 30, which is secured to the upper terminal of said top casting and holds the diaphragm 29 in operative position, the said casting having a tell-tale opening 30ª therein. A main controlling spring 31 is mounted in the casting 30 and bears against a spring washer 32, which is centered by said casting and in turn rests upon the diaphragm 29. The tension of the spring 31 is regulated by means of a screw 33, having a bearing and centering spring washer 34 mounted in the upper end of the spring 31, the spring regulating screw being provided with a set nut 42, for obvious reasons, and inclosed by a cap 35 applied thereover and held on the upper end or extremity of the spring chamber casting 30. The base of the cap 35 is provided with a slotted lug 36, through which projects a tongue 37, forming part of the spring chamber casting 30, and having an aperture 38 for receiving a lock, whereby the regulating screw 33 may be rendered accessible to authorized persons, but under other conditions may be firmly sealed or locked to prevent tampering with said screw and modifying or changing a predetermined adjustment. The stem 26 of the auxiliary valve 22 and the guide sleeve 27 coöperate to control communication between the diaphragm or pressure chamber 28 and the auxiliary valve chamber 19 by a vertical movement of the said stem within the sleeve.

In the center of the lower extremity of the top casing 18, a spring chamber 39 is secured, and has a central upwardly projecting stem 40, which projects freely into the underside and guides the auxiliary valve yoke 22. This stem 40 is surrounded by a spring 41, having its lower terminal resting on the bottom of the chamber 39 and its upper extremity contacting with the lower central portion of the yoke 22, the said spring being of sufficient strength to allow the auxiliary valve to follow the movement of the diaphragm 29 under varying initial pressure.

A port 43 leads from the inlet of the body of the valve to the pressure chamber 28, said port communicating with the pressure chamber below the diaphragm 29. The port 20, through the plug 17, is exteriorly closed by a plug 45, which is applied after drilling the said port. The piston 10 in this instance is also provided with a guide shank 46, which is engaged by the stem 7 of the valve and centers the latter.

Through the lower portion of the partition 4 a port 48 is formed and establishes communication between the outlet and inlet of the body of the valve, the said port constituting a by-pass and is controlled to limit the minimum flow of fluid therethrough by means of a screw plug 47, which is exteriorly accessible at the lower extremity of the body.

It will be understood also that the piston 10 will be provided with a suitable packing or ring, as indicated at 49, and also that between the body and the piston chamber ports 52 will be formed in the intercepting partition 52ª between the body of the valve and the said piston chamber. The piston 10 must have freedom of reciprocation in its chamber for the reason that the slightest accumulation of foreign substances or the expansion or contraction thereof would cause the piston to stick. To obviate this disadvantage the piston is permitted to have a loose fit and the packing ring is employed to prevent an excessive leakage past the piston. The partition 4 will also have a suitable valve seat 50, shaped to correspond to the upper part of the valve which coöperates therewith.

From the foregoing it will be observed that the pressure controlling device or regulator is somewhat similar to that disclosed by my Patent Number 784,408, dated March 7, 1905, with the exception of the particular features of construction set forth herein and consisting mainly of the passages or ports 51, the form of the stem 26, the addition of the port or passage 44, the port or by-pass 48 and plug 47, and the set nut 42 on the regulating screw 33, in operative relation to the other parts of the device or regulator which are similar to those disclosed in the patent aforesaid, with the exception that the port 43 and screw 44 in said patent have been eliminated in the present structure.

In operation, the controlling device is set at the desired initial pressure to be carried on in boilers by adjusting the screw 33. Should the initial pressure at the inlet or in the diaphragm chamber fall below that at which the spring 31 is set, the spring will depress the diaphragm 29, and the auxiliary valve 22 will be moved away from the knife edge seat 21. The fluid then passes through port 20 leading to port 44 and into the cylinder 9, exerting initial pressure upon the piston 10, and the latter being larger in area than the valve 6 forces the said valve from its seat 50, allowing fluid to pass through the opening 5 in the partition 4 and through the outlet 3, which, in turn, will speed up the blower engine or jet blower, causing initial pressure to increase, and as the said initial pressure increases and reaches a point in excess of the resistance of the spring 31, it raises the diaphragm 29 which will in turn allow the auxiliary valve 22, with the aid of the spring 41 and high pressure fluid to close port 20, thus permitting the high pressure fluid in cylinder 9 to escape around the piston 10, which has a free fit, and out through ports 52, thus causing the high pressure fluid on the underside of valve 6, with the aid of spring 14, to close the said valve. The limit screw 16 will be adjusted to give maximum flow to blower engine or jet and by-pass screw or plug 47 to give minimum flow, and after these adjustments are made the controlling device will have an automatic operation. It will be observed in this improved construction that after the main and auxiliary valves are closed there are no pistons or stems interposed between the high and low pressure sides of the controlling device, thus obviating leakage and avoiding starting the operation of the device at an improper time.

Having thus described the invention, what is claimed, is:

1. In a pressure controlling device of the class set forth, the combination with a casing having an inlet and outlet with a valve between the latter, a cylinder, and a piston in said cylinder controlling the valve, of an auxiliary chamber having a bypass leading to the cylinder, an auxiliary valve controlling the open and closed condition of the by-pass with relation to the auxiliary chamber, and means for controlling the said auxiliary valve to regulate the initial pressure to said cylinder, and comprising a spring, a diaphragm, a pressure chamber in which said diaphragm is located, and a port leading from the inlet side of the device and communicating with the pressure chamber below the diaphragm, the spring included in the means for controlling the auxiliary valve tending to open the latter as initial pressure varies.

2. In a pressure controlling device of the class set forth, the combination with a casing having an inlet and outlet, a valve controlling communication between the inlet and outlet and actuated by the high pressure fluid from the inlet side of the device, and a piston chamber having a piston therein, of a pressure chamber having port means directly communicating with the inlet or initial pressure receiving part of the casing, a diaphragm in said pressure chamber, an auxiliary chamber having communication with the pressure-chamber, a by-pass establishing communication between the auxiliary chamber and the piston chamber, and an auxiliary valve in the auxiliary chamber for automatically controlling communication between the pressure chamber and the auxiliary chamber and the latter and the piston chamber.

3. In a pressure controlling device of the class set forth, the combination with a casing having an inlet and outlet, a valve controlling communication between the inlet and outlet, a pressure chamber having communication with the inlet portion of the casing, a diaphragm in the said pressure chamber, and a piston chamber having a piston therein coöperating with the valve controlling communication between the inlet and outlet, an auxiliary chamber having means for establishing communication between the same and the pressure chamber and piston chamber, and an auxiliary valve for controlling the open and closed condition of the communicating means between the auxiliary chamber and pressure and piston chambers, the means of communication between the auxiliary chamber and piston chamber being in the form of a by-pass.

4. In a pressure controlling device of the class set forth, the combination with a casing having an inlet and outlet, a valve controlling communication between the said inlet and outlet, a pressure chamber having communication with the inlet side of the device to permit the initial high pressure to coöperate therewith, and a piston cylinder having a piston therein coöperating with the valve controlling communication between the inlet and outlet portions of the casing, an auxiliary chamber having a closed bottom and provided with means establishing communication between the same and the pressure chamber and also with means entering above the bottom to set up communication thereof with the piston chamber, and an auxiliary valve having opposite extremities working in conjunction with the communicating means between the auxiliary chamber and the pressure and piston chambers to control communication of the latter chambers with the auxiliary chamber.

5. In a pressure controlling device of the class set forth, the combination with a casing having an inlet and outlet, a valve controlling communication between the inlet and outlet, a pressure chamber having a diaphragm therein, the pressure chamber having communication with the inlet side of the casing, and a piston chamber with a piston coöperating with the said valve, of an auxiliary valve chamber with an auxiliary valve therein and communicating with the piston chamber and the pressure chamber, means for automatically regulating the high pressure fluid leading to the piston chamber, a by-pass located between the inlet and outlet sides of the casing for regulating the minimum flow of fluid, and an exteriorly operated screw means coöperating with the said bypass.

6. In a device of the class set forth, the combination of a pressure chamber having a diaphragm therein, an auxiliary valve chamber having communication with the pressure chamber, an auxiliary valve in the latter chamber, a piston chamber with a piston therein, a bypass between the piston chamber and auxiliary chamber, and a valve casing have an inlet and outlet with an intermediate valve controlling communication between the same, the said inlet having direct communication with the pressure chamber by means separate and apart from the communication between the pressure chamber and auxiliary chamber and the latter and the piston chamber.

7. In a device of the class set forth, the combination with a casing having an inlet and outlet, a valve controlling communication between the said inlet and outlet, and means coöperating with the said valve for automatically actuating the same, of an auxiliary valve chamber having an auxiliary valve therein, a pressure chamber having a diaphragm therein, a guide sleeve provided with openings communicating with the pressure chamber below the diaphragm, and also with the auxiliary valve chamber, the stem of the auxiliary valve being movable through the sleeve and provided with flat faces coöperating with the opening in the said sleeves, and means for admitting high pressure to the pressure chamber and diaphragm in the latter.

8. In a device of the class set forth, the combination with an inlet and an outlet, a main valve controlling communication between the inlet and outlet, and a piston chamber having a piston therein operating with the main valve, of an auxiliary valve chamber provided with a closed bottom, and a port means leading from an intermediate portion thereof to said piston chamber, an auxiliary valve in the auxiliary valve chamber to automatically control the high pressure fluid passing through the said port of the piston chamber, and means for controlling the entrance of high pressure fluid to the auxiliary valve chamber.

9. In a pressure controlling device of the class set forth, the combination with a casing having an inlet and outlet, a valve controlling communication between the inlet and outlet, a pressure chamber having a diaphragm therein, and a piston chamber with a piston therein coöperating with said valve controlling communication between the inlet and outlet, and an auxiliary valve chamber with an auxiliary valve therein, communication between an intermediate portion of the auxiliary valve chamber and the piston chamber being established by a port extending through a portion of the inclosing wall for the said auxiliary chamber and piston chamber, yielding means coöperating with the diaphragm in opposition to the high pressure of the latter, a bypass located between the inlet and outlet sides of the casing for a minimum flow of fluid, a screw plug coöperating with the bypass, and an adjustable limit means for controlling the maximum flow of the fluid.

10. In a device of the class set forth, the combination of a pressure chamber having a diaphragm therein, means for permitting a high pressure fluid to act on one side of the diaphragm, an opposing means loosely coöperating with the other side of the diaphragm, a spring means bearing on the said opposing means, a casing having an inlet and outlet, a valve controlling communication between the inlet and outlet, an auxiliary valve, and piston devices between the pressure chamber and the valve controlling communication between the inlet and outlet.

11. In a device of the class set forth, the combination with a casing having an inlet and outlet, and a valve controlling communication between the inlet and outlet, of an auxiliary valve chamber having an apertured member extending thereinto and provided with a knife edge seat, a pressure chamber with a diaphragm therein and having communication with the inlet, an auxiliary valve coöperating with the knife edge of the said member and also controlling communication between the auxiliary valve chamber and pressure chamber, and means between the auxiliary valve chamber and auxiliary valve controlling the communication between the inlet and outlet.

12. In a device of the class set forth, the combination with an inlet and outlet and a main valve controlling communication between the inlet and outlet, of a piston chamber having a piston therein coöperating with the main valve, an auxiliary valve chamber having an auxiliary valve therein and provided with an apertured member projecting thereinto and communicating with a port between the piston chamber and auxiliary valve chamber, a pressure chamber having communication with the auxiliary valve chamber, the auxiliary valve being provided with means to control communication between its chamber and the said pressure chamber, and the latter having communication with the inlet or high pressure side of the device, a diaphragm in the pressure chamber, and means engaging the diaphragm and acting in opposition to the pressure on the latter.

In testimony whereof I have hereunto set my hand in presence of two subscribing witnesses.

WILLIAM F. KRICHBAUM.

Witnesses:
HARRY P. DAY,
ERNEST C. LUM.